Feb. 15, 1949.  J. V. COWAN  2,461,723
APPARATUS FOR MOLDING WAX
Filed May 7, 1945  2 Sheets-Sheet 1

INVENTOR
J. V. COWAN
BY Hugh S. Wertz
ATTORNEY

Feb. 15, 1949.   J. V. COWAN   2,461,723
APPARATUS FOR MOLDING WAX
Filed May 7, 1945   2 Sheets-Sheet 2
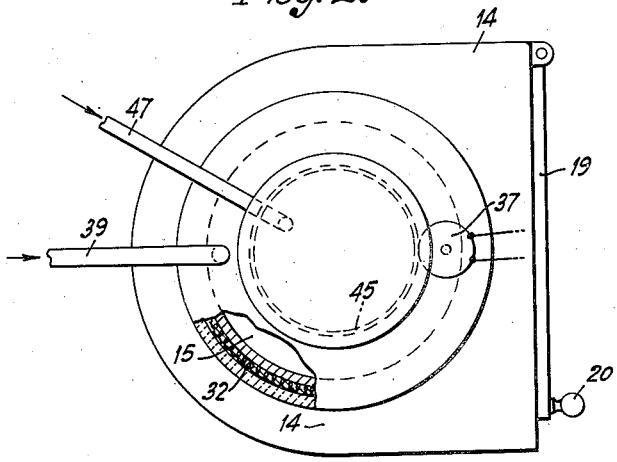
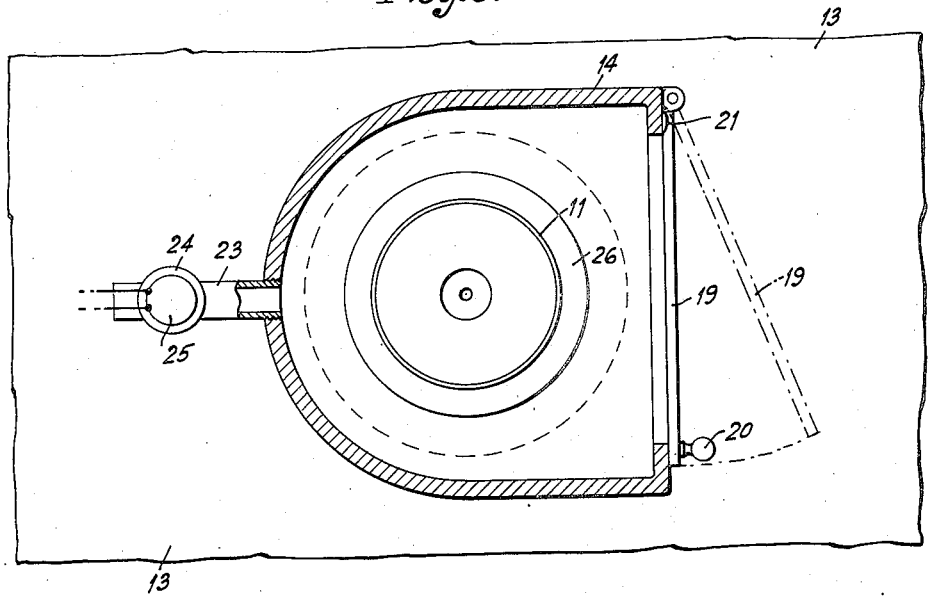
INVENTOR
J. V. COWAN
BY Hugh S. Wertz
ATTORNEY Patented Feb. 15, 1949

2,461,723

UNITED STATES PATENT OFFICE 2,461,723

APPARATUS FOR MOLDING WAX

John V. Cowan, Williston Park, N. Y., assignor of one-half to Ysak Pessell, Brooklyn, N. Y.

Application May 7, 1945, Serial No. 592,309

2 Claims. (Cl. 18—30)

This invention relates to casting and more specifically to apparatus for forming patterns of wax and the like for use in casting machines.

For many forms of casting machines it is customary to use wax patterns. These patterns can be cast or injected under pressure in a mold or die while the wax is in liquid form and then allowed to cool. The finished pattern takes the shape of the mold or die but due to shrinkage the wax pattern is smaller than the cavity in the mold or die. This can be counteracted by making the cavity larger but as some waxes shrink more than others in cooling, this method of correction is at best uncertain and sometimes impossible. The present invention relates to methods of and apparatus of forming patterns of this type in which this disadvantage is alleviated or not present.

It is an object of this invention to provide novel apparatus for forming patterns of wax and the like which are suitable for use in casting jewelry, dental parts or industrial parts, for example.

It is another object of this invention to provide apparatus for forming patterns of wax and the like which utilize vacuum and pressure operations.

Other objects, some of them more or less related to those given above, will be apparent as the description proceeds.

In accordance with the present invention, molten wax or similar material is forced by pressure into a die or mold cavity which is complementary to the shape of the finished pattern and which is in an evacuated chamber. Pressure, preferably having a still higher value, is applied to the wax while it is cooling to force it against the sides of the cavity and thus compensate for the shrinkage of the wax in the cavity. When the wax in the cavity is completely cooled, the pressure is removed, atmospheric pressure reestablished in the chamber and the die or mold removed. The finished pattern is almost exactly the same size as the cavity in which it was formed.

In accordance with a specific illustrative embodiment of the present invention, a cylindrical container having a heating coil therearound keeps the wax in a molten condition. This container is open to the atmosphere and has a valved exit into a lower cylindrical container provided with a pipe through which high gas pressure can be applied to the wax in this container forcing it through a valved opening into a thick walled cylinder within this container. This cylinder is provided with a piston having a large head in a double-acting air cylinder located above the upper container. After a sufficient amount of wax has been forced into the cylinder and out of the valved exit port thereof into an enclosure member for the die or mold to fill the cavity therein, high pressure is applied to the top of the large piston head thus exerting a tremendous pressure on the relatively small piston and causing it to force the wax into the die under great pressure to overcome the effect of shrinkage. The enclosure member has a platen at the lower portion thereof which is moved vertically by a piston member moving within a double-acting air cylinder. Prior to the ejection of the wax from the small cylinder, the die or mold is placed on the platen through a spring-biased door of the enclosure member. The door is held closed while the enclosure member is evacuated and it then remains closed due to the difference in pressure between the outside and inside. The platen is raised until the exit port of the small cylinder is adjacent the entrance to the die or mold cavity. The wax is then ejected from the small cylinder as described above. After the mold or die cavity is filled with the wax, air is applied to the lower surface of the large piston head forcing the piston upward closing thereby the valved exit port and permitting wax to be sucked into the small cylinder below the piston from the lower wax container. Atmospheric pressure is reestablished in the enclosure member causing the door to spring open. The platen is then lowered and removed, the wax pattern being removed from the die or mold by well-known means. The pattern formed by the method and apparatus of this invention is almost exactly the same size as the die cavity and of complemental shape thereto.

The invention will be more readily understood by referring to the following description taken in connection with the accompanying drawings forming a part thereof, in which:

Fig. 2 is a plan view of the machine of Fig. 1 with portions broken away; and

Fig. 3 is a horizontal cross-sectional view taken along the lines 3—3 in Fig. 1.

Figure 1:
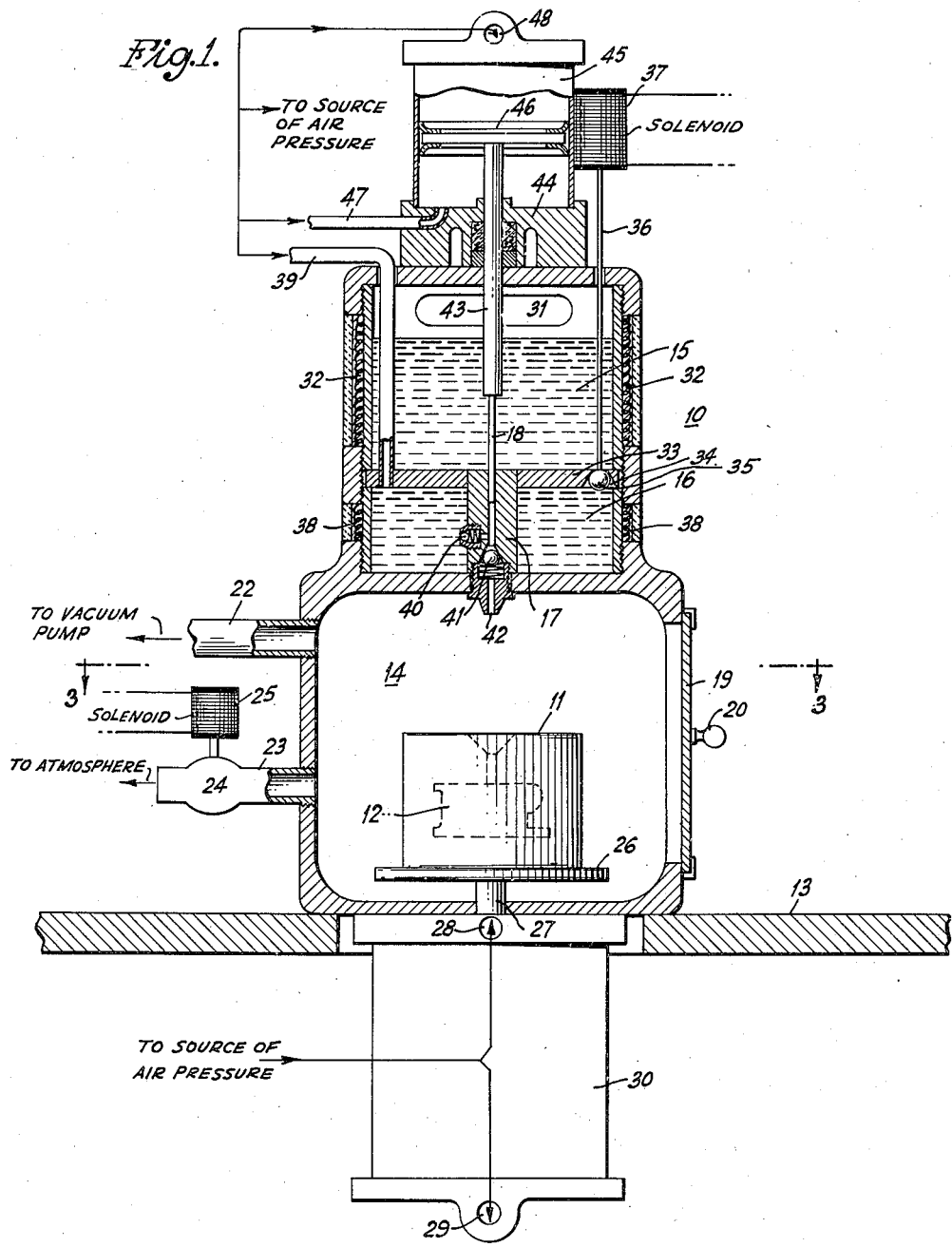
Fig. 1 is elevation view, partly in cross-section, of a machine, in accordance with the invention, for injecting wax and the like into the cavity of a mold or die.

Referring more particularly to the drawings, Fig. 1 shows, by way of example for illustrative purposes, a machine 10 for injecting wax and/or similar substances into a die or mold 11 having a cavity 12 therein for the purpose of forming a wax pattern of a shape complemental to that of the cavity. The machine 10 is supported from a platform 13 and comprises an enclosure member 14 for the die 11 and, positioned above the enclosure member, an upper container 15 for the wax and a lower container 16 therefor, the latter surrounding a thick-walled cylinder 17 opening into the enclosure member 14 and having a piston 18 therein operated by means to be described hereinafter.

The enclosure member 14 is shown in horizontal cross-section in Fig. 3 and in plan in Fig. 2 so reference will now be made to those figures as well as to Fig. 1. The member 14 has a door 19 which is provided with a suitable handle 20. The door is spring-biased, as by a strip 21 of spring steel, to the open position. A pipe 22 is used to exhaust the member 14 of air pressure and is preferably connected to a suitable vacuum pump (not shown) for accomplishing this purpose. A second pipe 23 leads to the atmosphere through a valve 24 controlled by a solenoid 25.

The die 11 rests on a platen 26 which is attached to a piston rod member 27 moved in a vertical direction by means of air pressure applied to one or the other of the two ports 28 and 29 of the double-acting air cylinder 30. Air applied to the port 29 causes the platen to be raised while air applied to the port 28 causes it to be lowered.

The wax or similar substance to be used in the machine 10 is placed in the upper container 15 through the opening 31 therein. The container 15 is cylindrical and has an insulated heating element 32 around it for causing the wax to be melted or maintained in that condition. The container 15 has an opening 34 in the bottom 33 thereof leading to the lower container 16. This opening is closed by a ball valve 35 operated by a rod 36 actuated by solenoid 37 at the appropriate time in the operating cycle to permit wax to flow into the container 16 which has an insulated heating element 38 around it. A pipe 39 leading to a source of air pressure passes through the container 15 and into the container 16 for a purpose which will be explained below.

Placed coaxially with and surrounded by the container 16 is the thick-walled cylinder 17, the walls being much thicker than the inside diameter of the cylinder due to the tremendous pressure exerted therein. A valve 40 comprising a ball and spring, such as is commonly used in grease guns, for example, is placed in a passageway leading from the container 16 to the interior of the cylinder 17 while a similar valve 41 is placed in the exit port 42 of the cylinder 17 leading into the enclosure member 14.

The piston 18 in the cylinder 17 is attached to a piston rod 43 of larger diameter which passes through a block 44 serving as one end of a double-acting air cylinder 45. The piston rod 43 has a relatively large head 46 attached thereto and it can be driven up or down by air pressure applied through pipe 47 or port 48, respectively. It will be apparent that due to the great difference in size of the piston head 46 and the diameter of the piston 18 the pressure in pounds per square inch exerted by the latter is many times the pressure in pounds per square inch on the head 46 as the pressures per unit area are inversely proportional to the piston areas. Thus when the piston 18 is driven downwardly, as will be explained below, a tremendous pressure is exerted on wax in the cylinder 17 and it is driven through the exit port 42 into the die 11 below at great pressure.

The operation of the machine 10 will now be described. The door 19 is opened and the die or mold 11, having a cavity 12 therein corresponding to the shape of the desired pattern to be made, is placed on the platen 26. The door is then closed and held closed while the air in the enclosure member 14 is evacuated by means of a vacuum pump connected to the pipe 22. The valve 24 is, of course, closed during this operation. As soon as the member 14 is evacuated or the pressure therein reaches a very low value, the difference in pressure between the outside and the inside of the member 14 is sufficient to overcome the bias of the spring 21 and the door is held closed by this pressure differential. An air pressure is then introduced into the port 29 causing the platen 26 to be raised until it is pushed tightly against the exit port 42 of the cylinder 17. The wax or similar substance in the container 15 has been made molten or maintained in that condition by means of electric current applied to the heater coils 32. The valve 35 has been open and molten wax from the container 15 flows downwardly into the container 16 where it is maintained in a molten condition by current applied to the heating coils 38. At this point the solenoid 37 is actuated to raise the rod 36 and close the valve 34. Air pressure is then applied to the pipe 39 to force molten wax through the valves 40 and 41 and exit port 42 into the evacuated die 11. Due to the vacuum there are no air bubbles in the wax and the pressure forces the wax into every part of the cavity. In cooling, all waxes of the type used for this purpose shrink some, and by unequal amounts, and the pattern normally tends to become somewhat smaller than the cavity. In accordance with the present invention, however, this effect is compensated by forcing wax into the die under still greater pressure while it is cooling. To accomplish this, the solenoid 37 is de-energized, the air pressure in the pipe 39 released, and air pressure is introduced in the port 48 causing the piston head 46 and hence the piston 18 to be driven downwardly under tremendous pressure thus feeding as much wax through the valve 41 and the exit port 42 into the die 11 as is required by the shrinking of the wax already introduced therein. This also causes valve 40 to close. After the die is filled, the air pressure in the port 48 is released and air pressure is applied in the pipe 47 to raise the piston head 46 and hence the piston 18. This latter action allows valve 41 to close and valve 40 to open and by suction introduces fresh wax into the cylinder 17. The solenoid 25 is then energized and the valve 24 thereby opened to reestablish atmospheric pressure in the enclosure member 14 and causes the door 19 to be swung open. The air pressure at the port 29 is released and air pressure applied at the port 28, driving the piston rod 27 and hence the platen 26 downwardly. The die 11 is then removed from the enclosure member 14 and the pattern taken from the die.

Various changes can be made in the embodiment described above without departing from the spirit of the invention, the scope of which is indicated by the appended claims.

What is claimed is:

1. A machine for injecting molten material into a die having an opening at the upper portion thereof, comprising a vertically movable platen for supporting said die, a vacuum chamber for enclosing said die and platen, means for evacuating and venting said chamber, a container for molten material positioned above said vacuum chamber, said container being divided into upper and lower compartments connected by a valved passage, heating means for maintaining the material in said two compartments in a molten condition, a second valved passage between said upper compartment and said vacuum chamber, means for raising the platen in said vacuum chamber until the opening in the top of said die is closely adjacent said second passage and for maintaining the platen in said position, a third valved passage between said lower compartment and said second passage, pressure means, adapted to be operated when the valve in said first passage is closed and the valves in said second and third passages are open, for forcing molten material under a first pressure which is greater than atmospheric pressure into the die in said vacuum chamber, a piston in said second passage, and means for driving said piston downwardly in said passage at a pressure much greater than said first pressure to force additional molten material in said die to compensate for the shrinkage of the pattern formed therein due to cooling.

2. The combination of elements as in claim 1 in which the walls of said second passage are much thicker than the diameter of said piston therein and said piston is mechanically connected to a second pressure-actuated piston having an area many times larger than that of the first-mentioned piston.

JOHN V. COWAN.

REFERENCES CITED

The following references are of record in the file of this patent:

UNITED STATES PATENTS

| Number | Name | Date |
|---|---|---|
| 807,072 | Grimes | Dec. 12, 1905 |
| 1,072,738 | King | Sept. 9, 1913 |
| 1,214,904 | Doehler | Feb. 6, 1917 |
| 2,111,857 | Jeffery | Mar. 22, 1938 |
| 2,136,383 | Huck | Nov. 15, 1938 |
| 2,181,157 | Smith | Nov. 28, 1939 |
| 2,207,426 | Bailey | July 9, 1940 |
| 2,232,104 | Ernst | Feb. 18, 1941 |
| 2,259,187 | Shaw et al. | Oct. 14, 1941 |
| 2,274,279 | Shaw | Feb. 24, 1942 |
| 2,304,461 | Knowles | Dec. 8, 1942 |

FOREIGN PATENTS

| Number | Country | Date |
|---|---|---|
| 829,604 | France | July 1, 1938 |